United States Patent
Mori

(10) Patent No.: US 7,751,080 B2
(45) Date of Patent: Jul. 6, 2010

(54) DATA GENERATING DEVICE CAPABLE OF APPENDING DIFFERENT WATERMARKS TO CORRESPONDING PAGES

(75) Inventor: Hiromi Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 592 days.

(21) Appl. No.: 11/808,708

(22) Filed: Jun. 12, 2007

(65) Prior Publication Data
US 2007/0247667 A1 Oct. 25, 2007

Related U.S. Application Data

(60) Continuation of application No. 11/347,284, filed on Feb. 6, 2006, now Pat. No. 7,239,418, which is a division of application No. 09/797,828, filed on Mar. 5, 2001, now Pat. No. 7,027,179.

(30) Foreign Application Priority Data

| Mar. 3, 2000 | (JP) | ............................. 2000-059045 |
| Mar. 2, 2001 | (JP) | ............................. 2001-057823 |

(51) Int. Cl.
*G06F 15/00* (2006.01)
*G06K 1/00* (2006.01)
*G06K 15/00* (2006.01)
*G06T 5/00* (2006.01)
*H04N 1/407* (2006.01)

(52) U.S. Cl. ..................................... 358/1.18; 358/3.27
(58) Field of Classification Search .................. 358/1.1, 358/1.2, 1.6, 1.9, 1.11, 1.14, 1.18, 3.27
See application file for complete search history.

(56) References Cited

U.S. PATENT DOCUMENTS

| 5,465,160 | A | 11/1995 | Kamo et al. |
| 5,751,924 | A | 5/1998 | Hamada et al. |
| 5,963,968 | A | 10/1999 | Warmus et al. |
| 6,332,149 | B1 | 12/2001 | Warmus et al. |
| 2002/0059162 | A1 | 5/2002 | Shinoda et al. |
| 2002/0101599 | A1 | 8/2002 | Okimoto et al. |

FOREIGN PATENT DOCUMENTS

| JP | A 11-143668 | 5/1999 |
| JP | A 11-296334 | 10/1999 |
| JP | A 11-298717 | 10/1999 |

*Primary Examiner*—Douglas Q Tran
(74) *Attorney, Agent, or Firm*—Oliff & Berridge, PLC

(57) ABSTRACT

A computer is provided with an application and a printer driver. A user of the computer generates image data using the application. When the image data is for a plurality of pages, the user selects a desired watermark for each of the plurality of pages. The printer driver converts the image data into print data, and combines selected watermarks with the print data for corresponding pages, thereby generating updated print data. The updated print data is output as a single print job to the printer. The printer executes printing operations based on the print job so as to print an image on a plurality of pages, each formed with a corresponding watermark.

20 Claims, 7 Drawing Sheets

FIG.5
PAGE 1
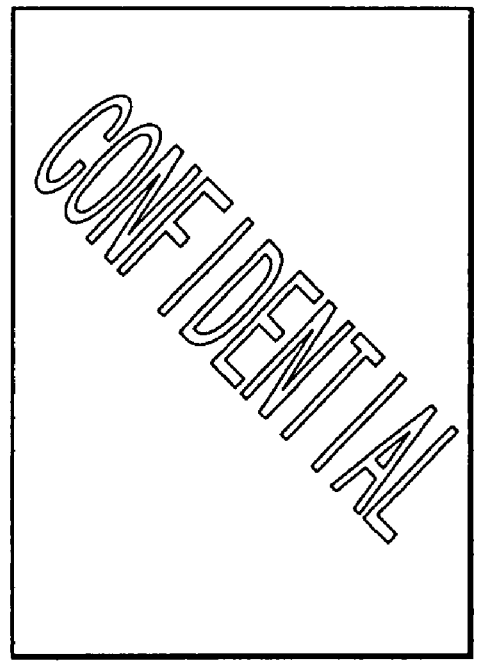
PAGE 2

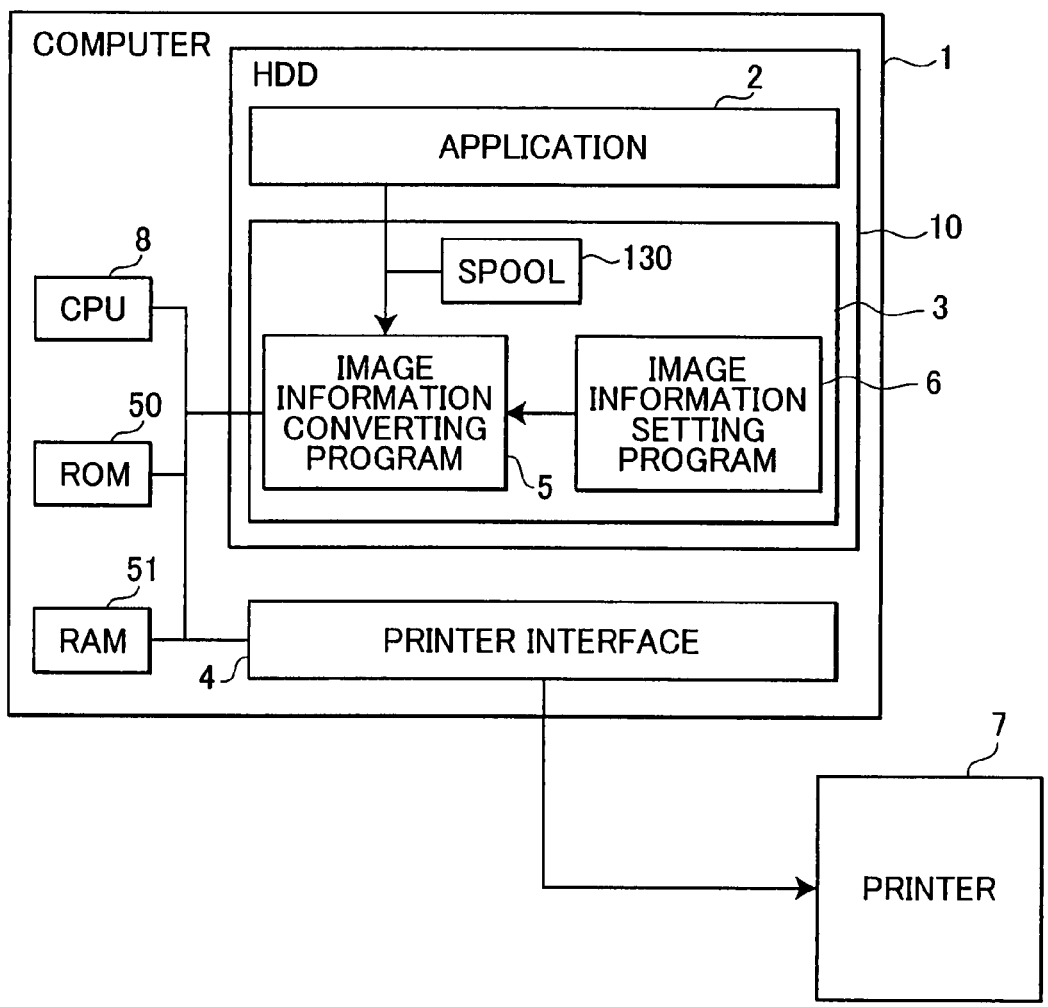

DATA GENERATING DEVICE CAPABLE OF APPENDING DIFFERENT WATERMARKS TO CORRESPONDING PAGES

CROSS-REFERENCE TO RELATED APPLICATIONS

This is a Continuation of U.S. patent application Ser. No. 11/347,284, filed on Feb. 6, 2006, which is a Divisional of U.S. patent application Ser. No. 09/797,828 filed on Mar. 5, 2001, the entire disclosures of which are hereby incorporated herein by reference in their entireties. These applications claim priority to Japanese Patent Application No. 2000-059045, filed on Mar. 3, 2000 and Japanese Patent Application No. 2001-057823 filed Mar. 2, 2001, the entire disclosures of which are hereby incorporated herein by reference in their entireties.

BACKGROUND

The present invention relates to a data generating device and also to a control unit, a control method, and a storing medium storing a program for controlling the data generating device.

A conventional computer is usually provided with an application software and a printer engine. In order for obtaining images using a printer, first a user generates image data using the application software at the computer. Then, the image data is converted into print data by the printer engine and transmitted to the printer. The printer performs printing operation for forming images based on the received print data.

Japanese Patent Application Publication (Kokai) No. 11-296334 discloses a computer including a memory which stores a plurality of overlay macros. The overlay macros are for automatically forming predetermined stamp images over an original image on a recording sheet. The stamp mark may be "CONFIDENTIAL", "COMPANY SECRET", "COPY", "IMPORTANT", and the like. In this configuration, a user generates image data and selects a desired overlay macro at the computer. Then, a printer engine of the computer converts the image data into print data, and appends the selected overlay macro to the print data. The print data appended with the selected overlay macro is output to a printer, and the printer executes printing for producing the original image with the stamp mark formed over the original image.

However, when the generated image includes a plurality of pages, then the user cannot select a different overlay macro for each of the pages. Therefore, when the user wishes to use a different stamp mark for each of the pages, the user needs to generate stamp marks on the application or retrieve the stamp marks from a memory and then attach the stamp marks to the respective pages using the application. These operations are time consuming and troublesome for the user.

In order to overcome the above problems, there has been proposed a printer system including a computer and a printer connected to the computer, where a user can set a different macros for each of a plurality of pages. Specifically, the printer includes a memory which stores a plurality of macros. When the user generates image data for a plurality of pages, the user selects a desired macro for each of the pages. Then, print data corresponding to the image data is output to the printer along with information indicating the selected macros. The printer retrieves macros which are indicated by the received information, and executes printing based on both the print-data and the retrieved macros. In this way, the printer can printout a plurality of pages based on a corresponding different macro.

However, in this case, the printer needs to include the memory for storing macros and also a large capacity for processing data. Moreover, because the memory of the printer usually has a limited memory capacity, a stamp mark having a relatively large data size may not be used.

SUMMARY

It is an objective of the present invention to overcome the above-described problems and also to provide a data generating device to generate a print job in a simple and reliable manner so that an image forming device forms images on a plurality of pages each with a different stamp mark based on the print job.

It is also an objective of the present invention to provide a control device, a control method, and a storing medium storing a program for controlling the data generating device.

In order for achieving the above and other objectives, there is provided a control device provided to an image data generating device including an image data generating unit that generates image data for a plurality of pages and a communication unit communicable with an external image forming device. The control device includes a receiving unit that receives the image data from the image data generating unit, a converting unit that converts one-page-worth of the image data into print data, a mark selecting unit that selects one of a plurality of marks for each one of the plurality of pages, and a mark combining unit that combines the print data with corresponding one of the plurality of marks selected by the mark selecting unit.

Also, there is provided an image data generating device including an image data generating unit that generates image data for a plurality of pages, a converting unit that converts one page worth of the image data into print data, a mark selecting unit that selects one of a plurality of marks for each one of the plurality of pages, a mark combining unit that combines the print data with corresponding one of the plurality of marks selected by the mark selecting unit, thereby updating the print data.

There is also provided a control method of controlling a data generating device communicable with an external image forming device. The control method includes the steps of a) selecting one of a plurality of marks for each of a plurality of pages, b) converting one-page-worth of image data into print data, and c) combining the print data with corresponding one of the plurality of marks selected in the step a), thereby updating the print data.

Further, there is provided a storing medium storing a program of controlling a data generating device communicable with an external image forming device. The program includes the programs of a) selecting one of the plurality of marks for each of a plurality of pages, b) converting one-page-worth of image data into print data, and c) combining the print data with corresponding one of the plurality of marks selected by the program a), thereby updating the print data.

Moreover, there is provided a control device provided to an image data generating device including an image data generating unit that generates image data and a communication unit communicable with an external image forming device. The control device includes a receiving unit that receives the image data from the image data generating unit, a converting unit that converts the image data into print data, a copy number selecting unit that selects a number of document copies, wherein the converting unit repeatedly converts the image data into print data for each of the document copies, a mark selecting unit that selects one of a plurality of marks for each one of the document copies, and a combining unit that repeatedly combines the selected one of the plurality of marks with the corresponding print data so as to update the print data for all of the document copies.

There is provided an image data generating device communicable with an external image forming device. The image data generating device includes an image data generating unit that generates image data, a converting unit that converts the image data into print data, a copy number selecting unit that selects a number of document copies, wherein the converting unit repeatedly converts the image data into print data for each of the document copies, a mark selecting unit that selects one of a plurality of marks for each one of the document copies, and a combining unit that repeatedly combines the selected one of the plurality of marks with the corresponding print data so as to update the print data for all of the document copies.

There is also provided a control method of controlling an image data generating device communicable with an external image forming device. The control method includes the steps of a) generating print data for a document, b) selecting a number of document copies, c) selecting one of a plurality of marks for each one of the document copies, d) combining the selected one of the plurality of marks with the print data, thereby updating the print data, and f) outputting the print data updated in the step d) to the external image forming device, wherein the steps d) and e) are repeatedly executed for all of the document copies.

There is provided a storing medium storing a program of controlling an image data generating device communicable with an external image forming device. The program includes the programs of a) generating print data for a document, b) selecting a number of document copies, c) selecting one of the plurality of marks for each one of the document copies, d) combining the selected one of the plurality of marks with the print data, thereby updating the print data, and e) outputting the print data updated by the program d) to the external image forming device, wherein the programs d) and e) are repeatedly executed for all of the document copies.

BRIEF DESCRIPTION OF THE DRAWINGS

The above and other objects, features and advantages of the present invention will become more apparent from the following description when taken in conjunction with the accompanying drawings, in which:

FIG. 5 is a plan view showing an example of printing results obtained by a printer connected to the computer of FIG. 1;

FIG. 6 is a block diagram of a computer according to a second embodiment of the present invention;

FIG. 7 is a plan view of a box included in a print dialog displayed on a monitor of the computer of FIG. 6.

DETAILED DESCRIPTION OF EMBODIMENTS

Next, computers according to preferable embodiments of the present invention will be described while referring to FIGS. 1 to 8. First, a computer 1 according to a first embodiment of the present invention will be described while referring to FIGS. 1 to 5.

Figure 1:
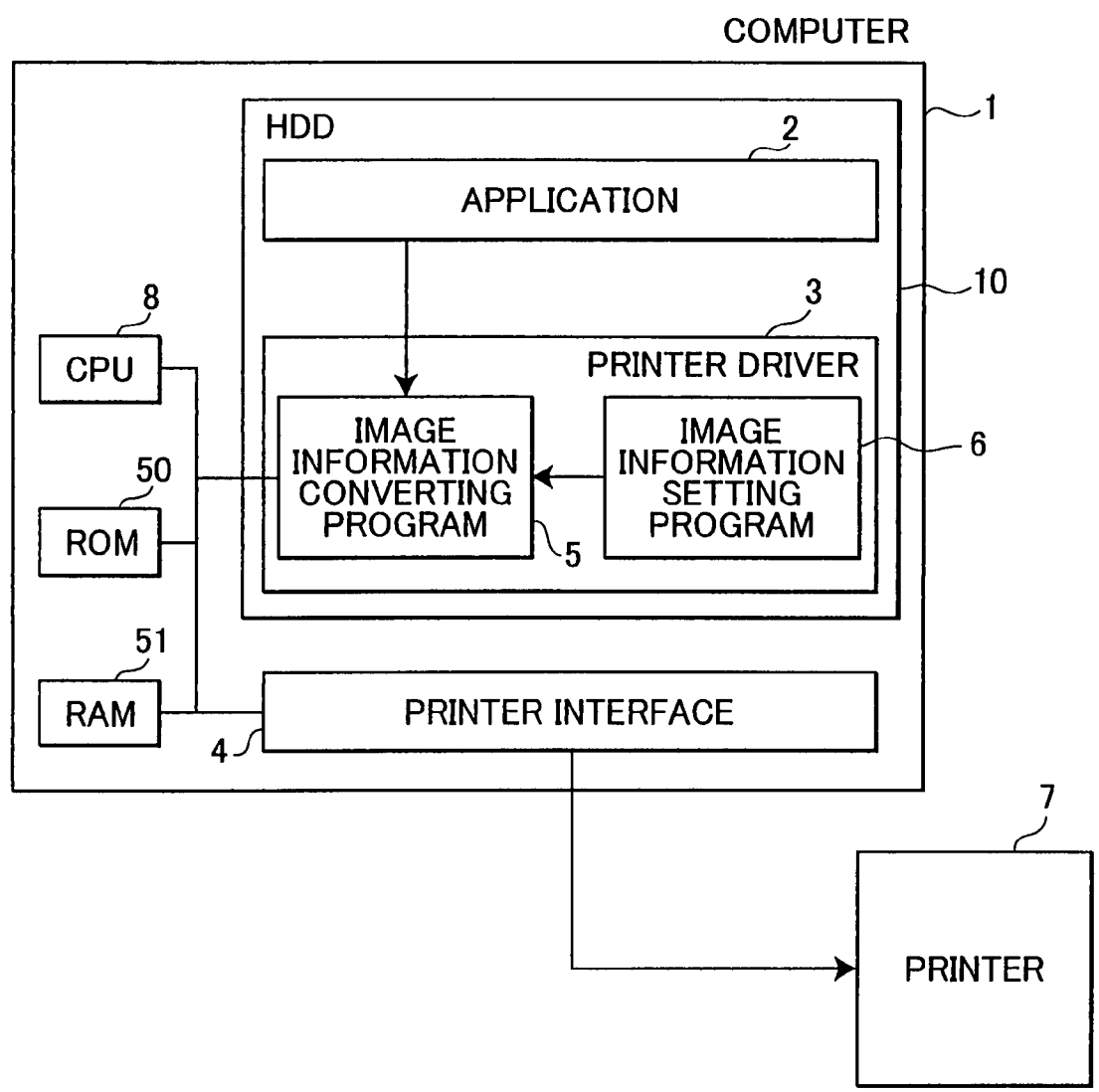
FIG. 1 is a block diagram of a computer according to a first embodiment of the present invention.
Figure 2:
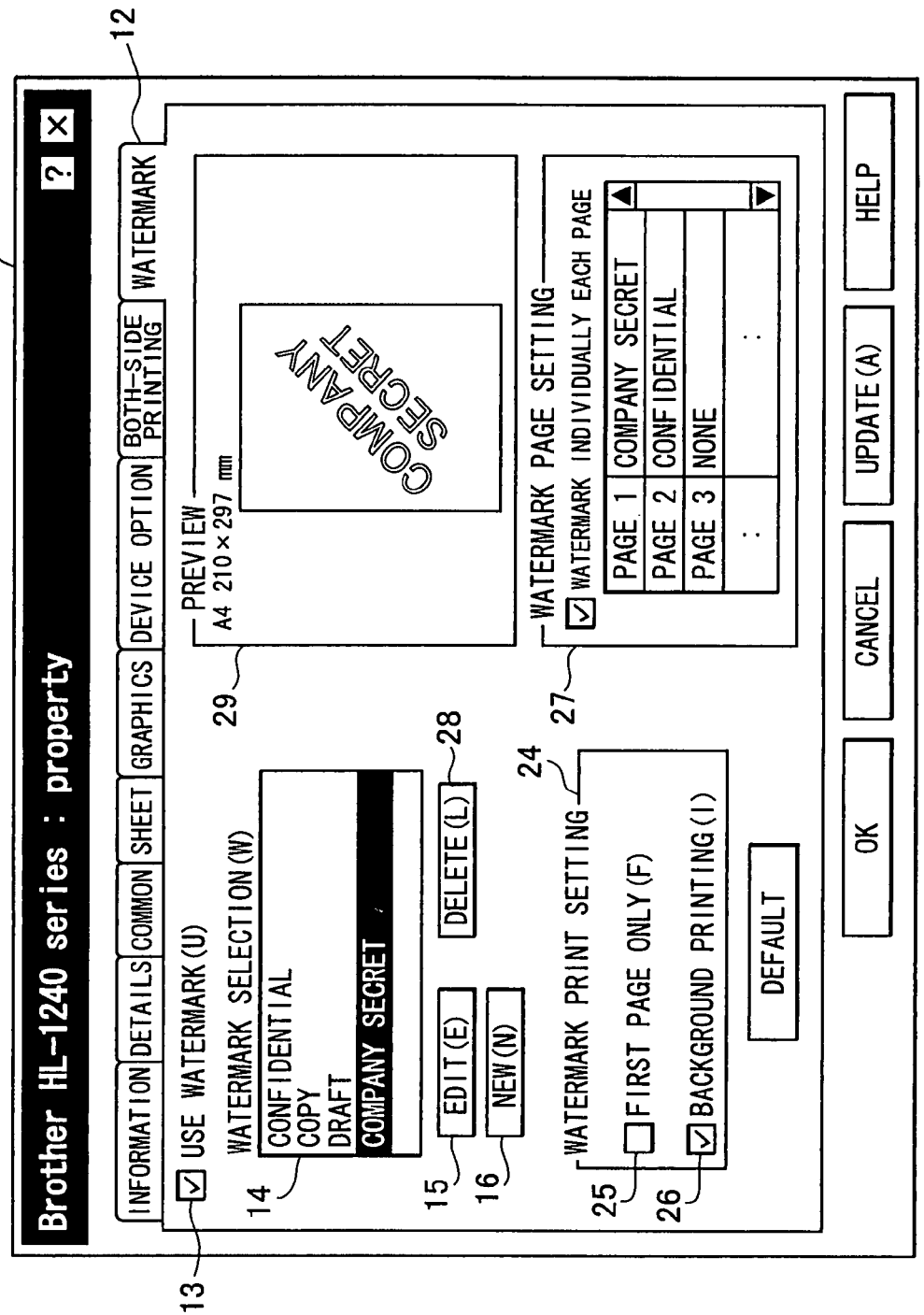
FIG. 2 is a plan view of a print dialog displayed on a monitor of the computer of FIG. 1.

As shown in FIG. 1, the computer 1 includes a central processing unit (CPU) 8, a read only memory (ROM) 50, a random access memory (RAM) 51, a hard disk drive (HDD) 10, and a printer interface 4. The printer interface 4 is connected to a printer 7.

An application 2 and a printer driver 3 has been installed into the HDD 10 from an external memory, such as a floppy disk. The application 2 is an application program such as a word processing software and the like. When a user generates an image including letters and characters, the application 2 is loaded into a predetermined region of the RAM 51, and is executed by the CPU 8.

The printer driver 3 is designed specifically for the printer 7. When a main power of the compute 1 is turned ON, the printer driver 3 is loaded into a predetermined region of the RAM 51 and executed by the CPU 8. The printer driver 3 includes an image information converting program 5 and an image information setting program 6.

The image information converting program 5 receives image data generated by the application 2, and converts the image data into print data in a form of predetermined tone and dot unit.

The image information setting program 6 is used for setting various information relating to printing, and includes a print setting program, a sheet setting program, a watermark setting program, a list display program, and the like. The print setting program is for setting basic printing conditions, such as printing quality, color adjustment, half-tone selection, and the like. The sheet setting program is for selecting a size and an orientation of a recording sheet to be used. The watermark setting program is for setting watermarks as marks. A watermark is a predetermined image including letters and/or characters formed over an original image on a recording sheet. The list display program is for displaying a watermark selection list 14 (described later) and the like.

The watermark setting program includes a watermark generating program, a watermark appending program, and a watermark individually appending program. The watermark generating program is for generating a plurality of different watermarks. The watermark appending program is for combining a specified watermark with print data so as to update the print data. The watermark individually appending program is for combining a plurality of different watermarks with print data for corresponding ones of plurality of pages so as to update the print data.

When the printer driver 3 receives image data generated by the application 2, the image information converting program 5 converts the image data into print data. At the same time, the image information setting program 6 sets various printing settings, and outputs the information as setting information to the information converting program 5. Then, the information converting program 5 outputs the print data appended with the setting information to the printer 7 via the printer interface 4.

Next, a process for combining a watermark with print data at the computer 1 will be described.

First, a user generates an image at the computer 1 by using the application 2. It is assumed that in the present example the image includes a plurality of pages. Next, the user controls the computer 1 to display a print dialog 11 shown in FIG. 2, on which the user selects desired printing settings. Specifically, the print dialog 11 includes an information dialog, a detail dialog, a common dialog, a sheet dialog, a graphics dialog, a device option dialog, a both-side printing dialog, and a watermark dialog. In the example shown in FIG. 2, a watermark dialog 12 is selected and displayed at the top of the dialogs.

Then, the user checks on a checkbox 13 for indicating that the user wishes to use a watermark. Next, the user selects a desired watermark among watermark selection list 14. In this embodiment, the watermark selection list 14 includes a "CONFIDENTIAL" watermark, a "COPY" watermark, a "DRAFT" watermark, and a "COMPANY SECRET" watermark.

When the user selects a desired watermark which is "COMPANY SECRET" in this example, then a preview window 29 displays the selected watermark so that the user can confirm how the selected watermark will be printed on a recording sheet.

Next, the user selects whether the selected watermark is formed on a first page only or all of the pages. If the user wishes to form the watermark on the first page only, then the user checks a checkbox 25 in a watermark print setting box 24. In this way, the selected watermark is set for the first page only, and no watermark is set for the rest of the pages. On the other hand, if the user wishes to form the watermark on all of the pages, then the user leaves the checkbox 25 unchecked or removes a checkmark from the checkbox 25. In this way, the selected watermark is set in common for all the pages.

Next, the user selects one of a background printing or a stamp printing. In the background printing, the watermark is printed as a background watermark of the image at a pale tone. On the other hand, in the stamp printing, the watermark is printed at the same density as that of the image. To select the background printing, the user checks on a checkbox 26 in the watermark print setting box 24. To select the stamp printing, the user leaves the checkbox 26 unchecked or removes a checkmark from the checkbox 26.

If the user wishes to form a different watermark for each of the plurality of pages, the user checks on a checkbox 27a in a watermark page setting box 27. When the checkbox 27a is checked, the settings indicated on the watermark page setting box 27 are selected in priority over the settings indicated on the watermark print setting box 24, so if the user wishes to use the settings indicated in the watermark print setting box 24, then the user leaves the checkbox 27a unchecked or removes a checkmark from the checkbox 27a.

In the watermark page setting box 27, the user selects a desired watermark for each of the pages. In the example shown in FIG. 2, the "COMPANY SECRET" watermark and the "CONFIDENTIAL" watermark are selected for the first page and the second page, respectively, and no watermark is selected for the third page.

Figure 4:
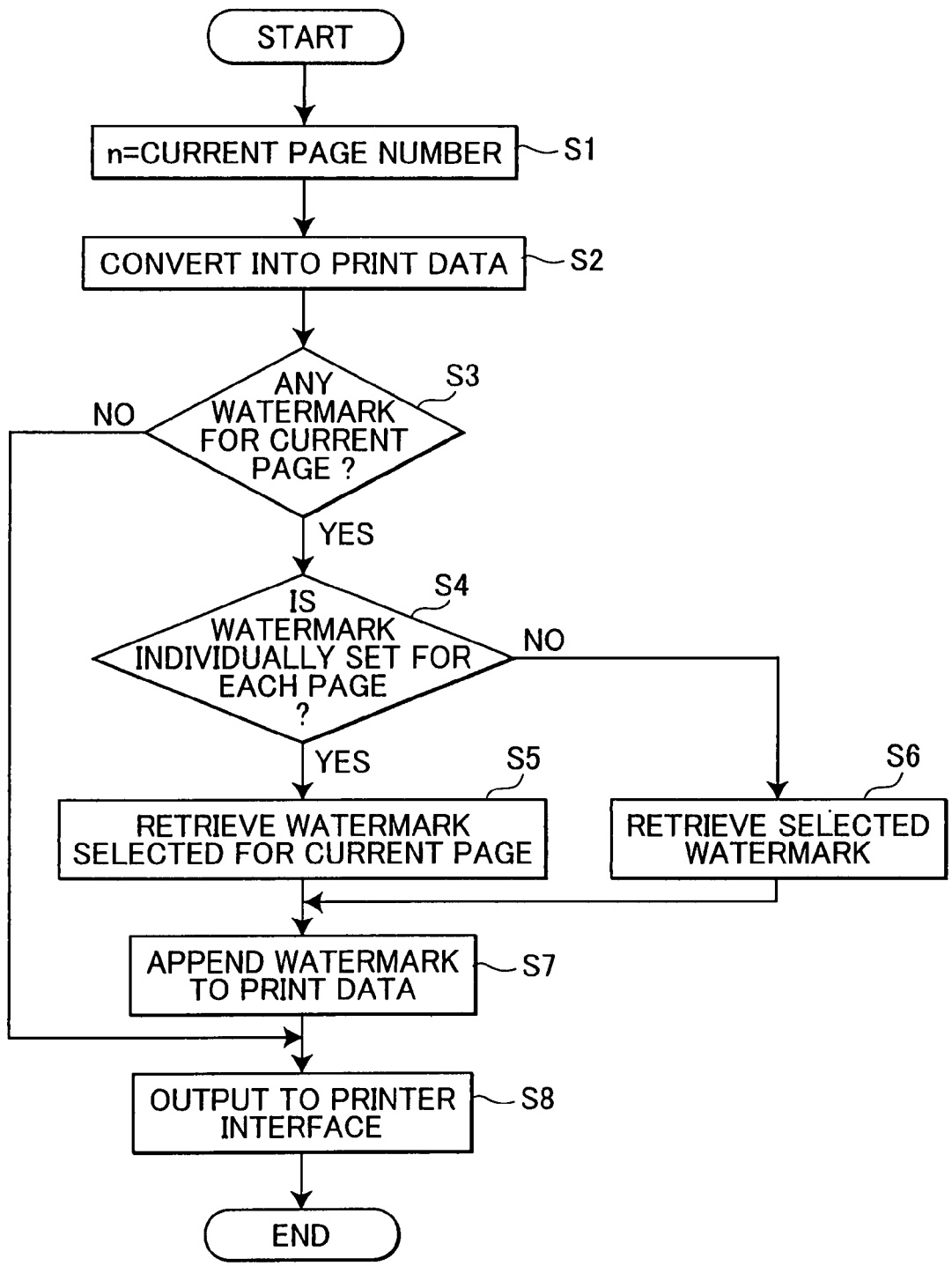
FIG. 4 is a flowchart representing a page process executed by the computer printer of FIG. 1.

Next, a page process will be described while referring to the flowchart of FIG. 4. The page process is executed when the user inputs a print command after having generated an image at the application 2. Once the page process is started, a page number of a current page is detected (S1), and one-page-worth of the image data is converted into print data for the current page (S2). Next, it is detected whether or not any watermark is selected for the current page (S3). If not (S3: NO), then the print data is output to the printer interface 4 (S8), and the present process is ended.

On the other hand, if so (S3:YES), then it is detected whether or not a watermark is individually selected for each of the pages (S4). If so (S4:YES), then a watermark selected for the current page is retrieved (S5) and combined with the print data (S7), thereby updating the print data. The updated print data is output to the printer interface 4 (S8), and the present process is ended.

On the other hand, if not (S4:NO), then a watermark selected in common for all pages is retrieved (S6), and combined with the print data (S7), thereby updating the print data. The updated print data is output to the printer interface 4 (S8), and the present process is ended.

The above-described page process is repeatedly executed for all pages. Then, the printer interface 4 outputs all the print data as a single print job to the printer 7. The printer 7 executes printing based on the print job. FIG. 5 shows an example of printing result. In this example, a first page and a second page are formed with original images (not shown) with the "COMPANY SECRET" watermark and the "CONFIDENTIAL" watermark formed thereover, respectively, at either the stamp printing or the background printing.

It should be noted that the user can add a new watermark to the watermark selection list 14, change any of the watermarks listed in the watermark selection list 14, and delete an unnecessary watermark from the watermark selection list 14 as desired.

Specifically, when the user wishes to add a new watermark, then the user clicks on the "NEW" button 16 of the print dialog 11, so the watermark setting dialog 17 is displayed. Then, the user inputs a title of the new watermark on the title box 18, and indicates whether the new watermark is a text watermark or a bitmap image watermark by checking a corresponding checkbox in the style box 19. When the watermark is a text watermark, the user sets text settings in the text box 20 for setting a text and a font, a size, a density, and a style of the text. The preview window 22 displays an image indicating how the watermark will be printed on a recording sheet. While examining the image on the preview window 22, the user selects, on the position box 23, an orientation and a position of the watermark on the recording sheet. When, the user clicks an OK button, then the new watermark is generated and added to the watermark selection list 14.

On the other hand, when the watermark is a bitmap image watermark, then the user indicates a storing location of bitmap data based on which the bitmap image watermark is generated. Specifically, the user can input a file name of the bitmap data in the bitmap box 21. Alternatively, the user can select a bitmap file by clicking on a reference button. Also, while examining the image on the preview window 22, the user can select enlargement or reduction in size on the bitmap box 21, and an orientation, a position, and the like on the position box 23. When, the user clicks an OK button, then the new watermark is generated and added to the watermark selection list 14.

Figure 3:
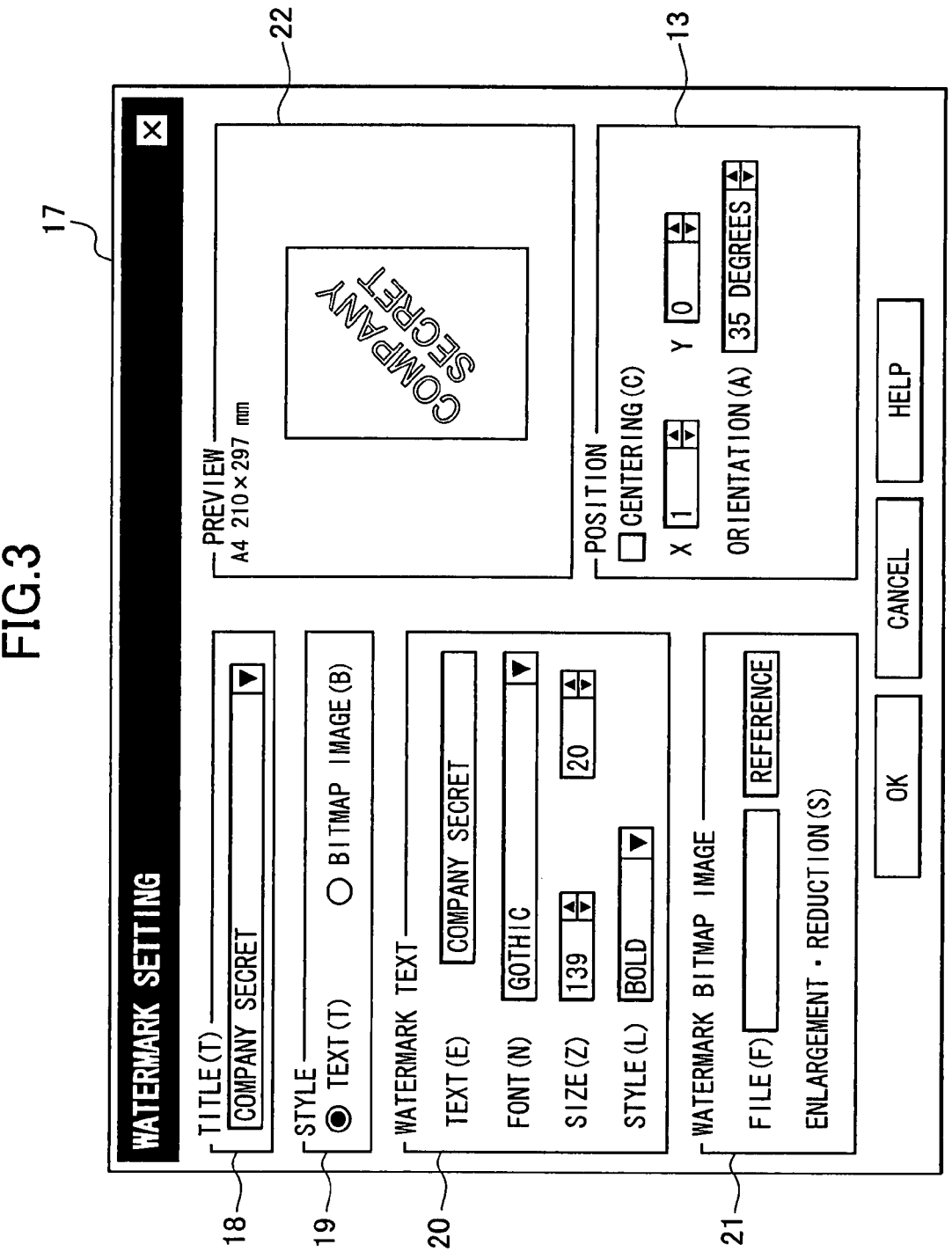
FIG. 3 is a plan view of a watermark setting dialog displayed on the monitor of the computer.

When the user wishes to change any watermark listed to the watermark selection list 14, then the user clicks on a change button 15 displayed on the watermark dialog 12. Then, the watermark setting dialog 17 of FIG. 3 is displayed. When the user controls the title box 18 to pull down and display the watermark selection list 14 and selects a desired watermark therefrom, and the preview window 22 displays an image of the selected watermark. The user can change any settings of the watermark as desired on the text box 20 or the bitmap box 21, and the position box 23. When the user presses the OK button, then the watermark is changed according to the settings.

When the user wishes to delete any watermark from the watermark selection list 14, the user select a watermark from the watermark selection list 14 on the watermark dialog 12, and then clicks on a delete button 28.

According to the above-described embodiment, the printer driver 3 of the computer 1 combines watermarks with print data for corresponding pages so as to generate updated print data, and outputting the updated print data as a single print job. For example, when a user generates image including a first page for a client and a second page for his or her own, the user may select a "CONFIDENTIAL" watermark for the first page, and a "COPY" watermark for the second page. Then, the printer driver 3 combines the "CONFIDENTIAL" watermark with the print data for the first page so as to produce updated print data for the first page, combines the "COPY" watermark with the print data for the second page so as to produce updated print data for the second page, and then outputs these two sets of the updated print data as a single print job to the printer 7 via the printer interface 4. In this way, different watermarks can be selected and set for each page in a simple and reliable manner.

Because the printer driver 3 combines watermarks with the print data for corresponding pages, there is no need for the user to select and set the desired watermarks for the pages using the application software 2 of the computer 1. Therefore, there is no need for the user to perform a complicated operations.

It should be noted that although a different watermark is set for each page in the above-described embodiment, a different watermark can be set for a plurality of selected pages. For example, the user may set a "COMPANY SECRET" watermark for first to third pages and a "CONFIDENTIAL" watermark for fourth to tenth pages. In this case, the first to third pages are handled as a page unit, and the fourth to tenth pages are handled as an another page unit.

Moreover, a plurality of table patterns may be prestored in the printer driver 3. The table pattern indicates correspondence between a page number and a preselected different watermark. In this case, there is no need for the user to set watermarks for each page every and each time when the user wishes to print images, but the user can merely select a desired one of the table patterns.

In addition, using the computer 1, a user can obtain a plurality of document copies of an original image and set a different watermark for each of the document copies. For example, it is assumed that an original image includes four pages and that the user wishes to obtain three copies of the original image with no watermark for a first copy, the "COMPANY SECRET" watermark for a second copy, and the "CONFIDENTIAL" watermark for a third copy. In this case, the application 2 outputs first-page worth of image data to the printer driver 3 three times each for each of the three copies. Then, the first-page worth of the image data for the first copy is combined with no watermark. The first-page worth of the image data for the second copy is combined with the "COMPANY SECRET" watermark, and the first-page worth of the image data for the third copy is combined with the "CONFIDENTIAL" watermark. Next, second-page-worth of the image data is output from the application 2 three times each for each of the three copies. The second-page worth of the image data for the first copy is combined with no watermark. The second-page worth of the image data for the second copy is combined with the "COMPANY SECRET" watermark, and the second-page worth of the image data for the third copy is combined with the "CONFIDENTIAL" watermark. The same process is repeatedly executed for all pages. Then, all the data is output as a single print job to the printer 7.

Next, a computer 101 according to a second embodiment of the present invention will be described while referring to FIGS. 6 to 8. It should be noted that components of the computer 101 which are the same as or similar to those of the computer 1 will be designated with the same numbering, and explanations thereof are omitted in order to avoid duplication in explanation.

As shown in FIG. 6, the computer 101 of the second embodiment has the same configuration as the computer 1 of the first embodiment shown in FIG. 1, except that the computer 101 further includes a spool 130. The spool 130 temporarily stores image data received from the application 2, and outputs the image data to the image information converting program 5 once for each document copy.

That is, first the user generates an image at the application 2 of the computer 101, and indicates a number of document copies he or she wishes to obtain. Next, the user performs watermark selection, that is, the user selects whether or not to use any watermark, whether to use a watermark on a first document copy only or commonly on all the document copies, or whether to use a different watermark for each of the document copies. This watermark selection is performed on a setting dialog similar to the watermark setting dialog 17 of FIG. 2. Because the process for selecting watermarks is similar to the process of the first embodiment described above while referring to FIG. 2, detailed description will be omitted. It should be noted that providing a dialog including a box 127 shown in FIG. 7 and the watermark setting dialog 17, the user can perform the process for setting watermarks in a simple manner.

Figure 8:
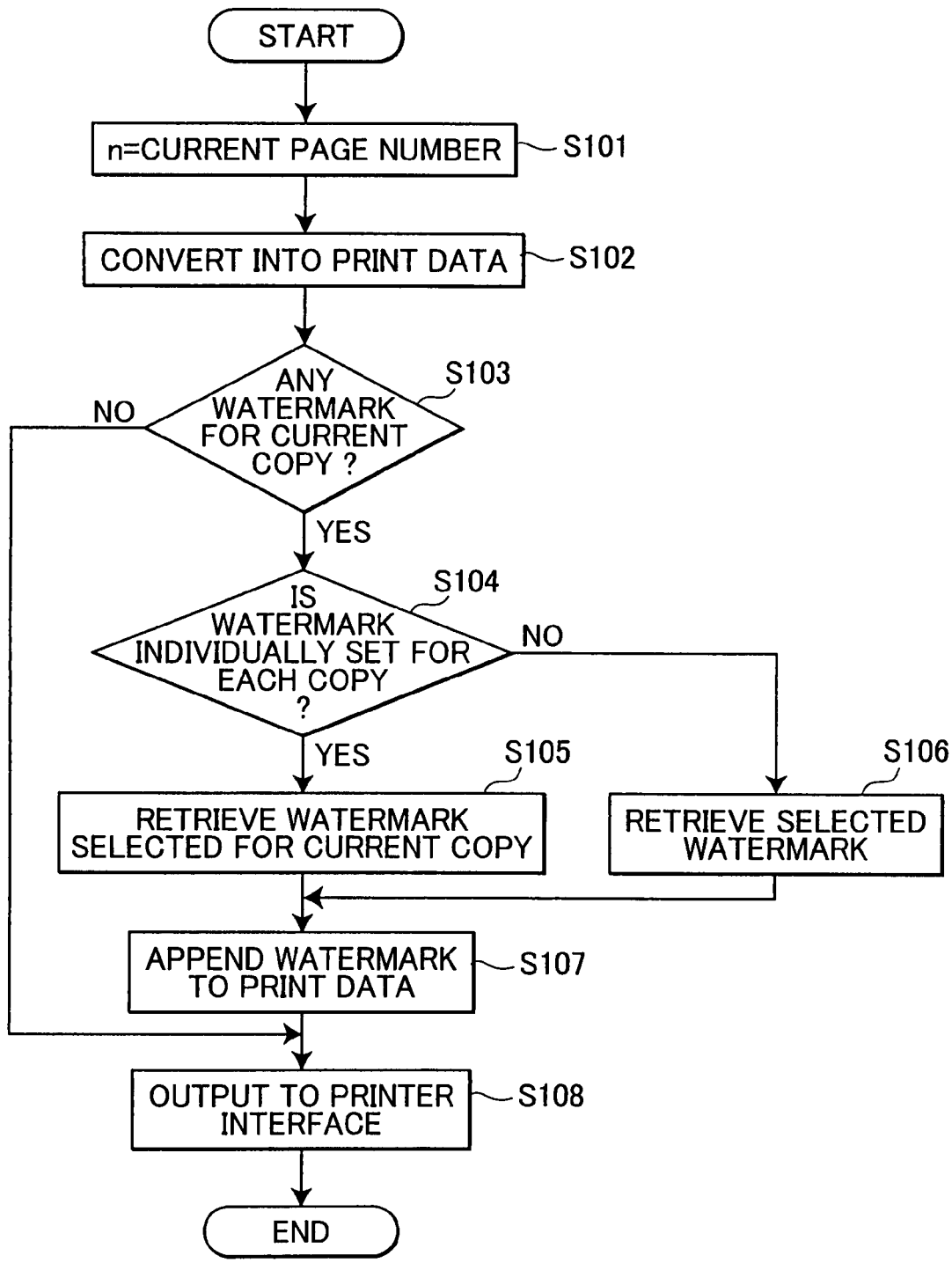
FIG. 8 is a flowchart representing a copy process executed in the computer of FIG. 6.

Next, when the user inputs a print command, a copy process represented by the flowchart of FIG. 8 is started. The copy process is for combining print data with a corresponding watermark so as to update the print data and for outputting the updated print data to the printer interface 4.

Once the copy process is started, first a copy number of a current document copy is detected (S101), and the image data is converted to print data (S102). Next, it is detected whether or not any watermark is selected for the current copy (S103). If not (S103:NO), then the print data is output to the printer interface 4, and the present process is ended. If so (S103: YES), then it is detected whether or not a watermark is individually selected for each of the document copies (S104). If so (S104:YES), then a watermark selected for the current document copy is retrieved (S105), and combined with the print data (S107), thereby updating the print data. The updated print data is output to the printer interface 4 (S108), and the present process is ended. On the other hand, if not (S104:NO), then a watermark selected in common for all the document copies is retrieved (S106), and combined with the print data (S107), thereby updating the print data. The updated print data is output to the printer interface 4 (S108), and the present process is ended. When the copy process is ended, then the printer interface 4 outputs the print data as a print job to the printer 7. The printer 7 executes printing based on the print job.

The above-described copy process is repeatedly executed for each of the document copies. As a result, the plurality of document copies each formed with the original image and a corresponding watermark are produced.

As described above, the user can select and set a desired watermark for each of a plurality of document copies in a simple and reliable manner.

It should be noted that the above-described copy process is executed in the same manner regardless of whether the image includes a single page only or a plurality of pages. That is, when the image includes a plurality of pages, image data for all pages are temporality stored in the spool 130. Then, the image data is converted into print data and combined with a watermark selected for a current copy. As a result, print data for a plurality of pages each combined with the selected watermark is generated and output to the printer interface 4.

According to the embodiments described above, print data is combined with watermarks and output as a single job to the printer 7, there is no need for the printer 7 to include a memory for storing watermarks nor a program for combining received print data and a watermark retrieved from the memory of the printer 7. Therefore, the configuration of the printer 7 can be simplified. Moreover, because an effect of the present invention is not limited by a memory capacity of the printer 7, a watermark which has a relatively large data size can be used regardless of which type of printer is used.

It should be noted that although the watermarks in the above-described embodiments includes stamp marks, such as "CONFIDENTIAL" and "DRAFT", the watermarks can also include any other type of information, such as a company logo, a company address, a company name, and the like. Because the watermarks are selected by a user as desired, there is no limitation between an the original image and watermarks to be used. That is, although in the above-described embodiments, the watermarks are selected in accordance with usage of a document page or a document copy, the watermarks can be selected regardless of usage of the document and contents of the original image.

While some exemplary embodiments of this invention have been described in detail, those skilled in the art will recognize that there are many possible modifications and variations which may be made in these exemplary embodiments while yet retaining many of the novel features and advantages of the invention.

For example, although in the above-described embodiment the printer driver 3 is installed to the computer 1 from the floppy disk, the printer driver 3 can be installed from any memory, such as CD-ROM, IC card, photomagnetic disk, and the like.

What is claimed is:

1. A method of controlling an image data generating device communicable with an external image forming device, comprising:
   a) selecting a number of document copies, where the number of document copies selected is more than one;
   b) selecting one of a plurality of marks for a first document copy;
   c) generating print data for each of the document copies; and
   d) combining the one of the plurality of marks for the first document copy with the print data for the first document copy to create combined data;
   wherein the print data for a second document copy is not combined with a mark.

2. The method according to claim 1, further comprising outputting the combined data and the print data for the second document copy to an external image forming device.

3. The method according to claim 1, further comprising selecting no mark for the second document copy.

4. The method according to claim 1, wherein the step of combining the one of the plurality of marks for the first document copy with the print data for the first document copy comprises combining the one of the plurality of marks with the print data for the first document copy on a page-by-page basis.

5. The method according to claim 4, wherein the one of the plurality of marks is not combined with at least one page of the print data for the first document copy.

6. The method according to claim 1, wherein the plurality of marks include any one or ones of characters and letters.

7. The method according to claim 1, wherein the mark is a watermark, the watermark being a predetermined image formed over at least a portion of the print data for the first document copy.

8. The method according to claim 1, further comprising generating the one of the plurality of marks.

9. A control device provided to an image data generating device including an image data generating unit that generates image data and a communication unit communicable with an external image forming device, the control device comprising:
   a) a selecting unit that selects a number of document copies, where the number of document copies selected is more than one;
   b) a mark selecting unit that selects one of a plurality of marks for at least one of the document copies;
   c) a converting unit that converts the image data into print data for each of the document copies; and
   d) a combining unit that combines the one of the plurality of marks for the at least one of the document copies with the print data for the at least one of the document copies, wherein another one of the at least one of the document copies is not combined with a mark.

10. The control device according to claim 9, wherein the mark selecting unit selects no mark for the other one of the at least one of the document copies.

11. The control device according to claim 9, wherein the combining unit combines the one of the plurality of marks with the print data for the at least one of the document copies on a page-by-page basis.

12. The control device according to claim 9, wherein the plurality of marks include any one or ones of characters and letters.

13. The control device according to claim 9, wherein the mark is a watermark, the watermark being a predetermined image formed over at least a portion of the print data for the at least one of the document copies.

14. The control device according to claim 9, further comprising a mark generating unit that generates the one of the plurality of marks.

15. A computer readable storage medium storing a computer program for a control device, the program useable to generate image data, the program comprising:
   a) instructions for selecting a plurality of document copies;
   b) instructions for selecting one of a plurality of marks for at least one of the document copies;
   c) instructions for converting the image data into print data for each of the document copies; and
   d) instructions for combining the one of the plurality of marks for the at least one of the document copies with the print data for the at least one of the document copies, wherein the print data for another one of the at least one of the document copies is not combined with a mark.

16. The computer readable storage medium according to claim 15, further comprising instructions for selecting no mark for the other one of the at least one of the document copies.

17. The computer readable storage medium according to claim 15, further comprising instructions for combining the one of the plurality of the marks with the print data for the at least one of the document copies on a page-by-page basis.

18. The computer readable storage medium according to claim 15, wherein the plurality of marks include any one or ones of characters and letters.

19. The computer readable storage medium according to claim 15, wherein the mark is a watermark, the watermark being a predetermined image formed over at least a portion of the print data for the at least one of the document copies.

20. The computer readable storage medium according to claim 15, further comprising instructions for generating the one of the plurality of marks.

* * * * *